April 12, 1960  F. A. FISHER  2,932,324
VALVE SEAL
Filed July 6, 1956
FIG. 3
FIG. 1
FIG. 2
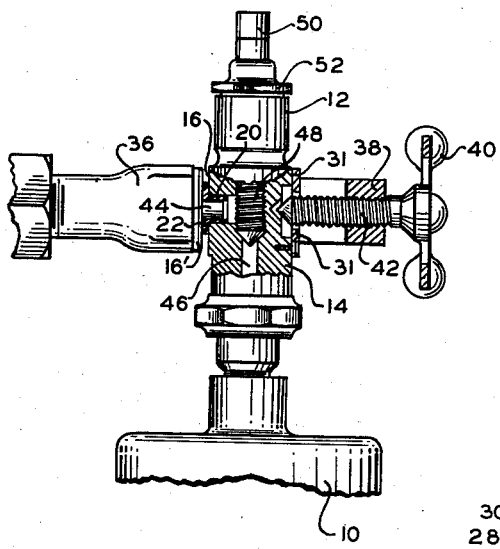
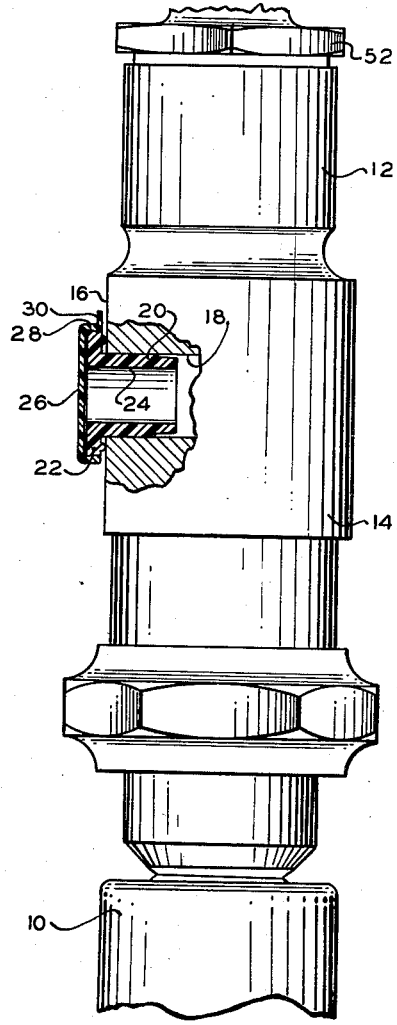
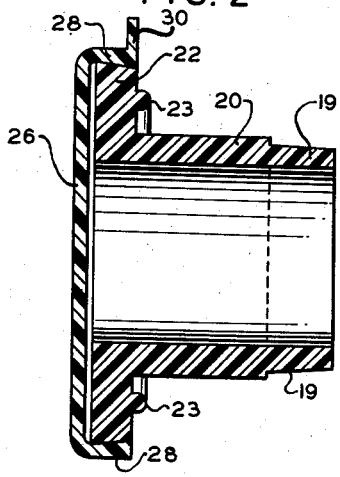
INVENTOR.
FRANK A. FISHER
BY United States Patent Office 2,932,324
Patented Apr. 12, 1960

2,932,324

VALVE SEAL

Frank A. Fisher, Tiburon, Marin, Calif., assignor to Air Reduction Company, Incorporated, New York, N.Y., a corporation of New York Application July 6, 1956, Serial No. 596,253

2 Claims. (Cl. 138—89)

This invention relates to improvements in gasket sealing means for gas cylinder valves and particularly flush seating valves of the so-called "yoke-type," commonly employed on small cylinders for use with anesthetic administering machines.

By "yoke-type" cylinder valve is meant the type of valve construction illustrated in the United States Patent No. 2,169,082. In this construction the valve discharge port is formed in a substantially flat face of a longitudinal neck portion of the cylinder valve. The neck portion is clamped in a connector yoke during use such that the discharge port is in registry with a communicating passage in the yoke through which the contents of the cylinder are delivered. Conventionally a gasket or washer is provided between the engaging faces of the valve and the yoke to afford a gas-tight sealing engagement.

Due to the relative vulnerability of the valve seating surface in this type of valve, it has been found that during handling of the cylinders some provision is required for the protection of the valve seating surfaces. Similarly, means are required also for preventing the entrance of dust or other foreign material into the exposed valve opening. The need for such care in the handling and storage of these cylinders is evident when it is seen that they are widely used for medical purposes where safety and efficiency of operation are of paramount importance. The presence of dust or other foreign matter in the valve port greatly increases the hazard of fire, particularly, in oxygen cylinders. Nicks or other injuries to the valve seat encourage leakage which is hazardous as well as inefficient.

To overcome these problems it has been customary after filling gas containers of this type to place on the body of the valve a protective tape which covers the discharge port and the adjacent seating surface. This tape subsequently is removed when the cylinder is placed in service. Since it is undesirable to provide a permanently seated gasket in the valve seating surface it has been the common practice to supply with each newly-filled cylinder a suitable gasket washer. This is usually attached to the cylinder in some suitable manner to prevent its loss during shipment. In some instances, the washer has been placed in an envelope that is secured to the valve body. The washer is then manually applied at the time of mounting the cylinder valve in the connector yoke.

The above practices which have been prevalent in connection with yoke-type cylinder valves have been subject to considerable objection because they have not entirely afforded the desired protection of the valve seating surface up until the time of use and also because they are relatively inconvenient. With respect to the latter, for example, a considerable amount of handling is involved in placing the valves in service. There is also the possibility, which does occur on occasion, of the loss or misplacement of the separate valve gasket.

It is, therefore, a primary object of the present invention to overcome several of the disadvantages of the present valve gasket sealing and protective means for cylinders of the "yoke-type" described hereinabove and to provide an improved self-retaining valve sealing and protective means.

It is a further object of the present invention to provide a self-retaining gasket for valves of the "yoke-type" having a removable protective, closure cap for occlusion of the valve port during storage and/or shipment.

A further object of the present invention is to provide an improved valve sealing means for cylinder valves of the "yoke-type" wherein a compressible valve gasket is provided with a cylindrical bushing portion insertable in the valve opening such that said gasket is self-retaining and in which a flexible cap member is adapted to be received and retained on said gasket prior to use.

Other objects and advantages of the present invention may be more fully understood by reference to the following description of the preferred embodiment thereof and the accompanying drawings in which:

Fig. 1 is an elevation view, partially sectioned, illustrating the combined valve gasket sealing and protective means of the present invention and showing the manner in which it is assembled with a yoke-type cylinder valve;

Fig. 2 is an enlarged sectional view of the valve sealing and protective means seen in Fig. 1; and Fig. 3 is a partial sectional view, of reduced scale, showing the manner in which the valve sealing means cooperates with a yoke connector in which the cylinder valve is mounted for discharging the contents of the cylinder.

Referring to Fig. 1 of the drawing, the numeral 10 represents a cylinder for containing a supply of a compressed gas such, for example, as oxygen or nitrous oxide. The cylinder is equipped with a valve 12 which is of the so-called "yoke-type." In a longitudinal portion 14 of the body of the cylinder valve 12 is formed a substantially flat seating face 16 which surrounds the terminal opening of a valve discharge passage 18. Seated in the end of the valve discharge passage is a self-retaining bushing 20 having an outer radial flange or rim 22 that overlies the surrounding seating surface of the valve face 16. A raised bead 23 forming a sealing ring on the rear of the annular flange facilitates the gas-tight engagement thereof with the valve body and a yoke connector. The bushing 20 which constitutes a self-retaining gasket and protective member, preferably is made of a relatively hard yet compressible material that is relatively resistant to ignition and not readily friable. One material found suitable is Cycolac, the trademark of the Marbon Corp., Gary, Indiana, which is a styrene-type resin. Nylon also may be used as well as other materials or polymers of suitable physical properties. In practice the bushing preferably is molded in the desired shape from the polymer or other material used. The rim 22 of the bushing which acts as the gasket and protective surface is retained against the flat seating surface of the valve by the inserted portion of the bushing which is proportioned with respect to the dimensions of the discharge passage 18 so as to provide a satisfactory frictional engagement therein. By making this portion slightly oversize the bushing is retained in place under all circumstances of manipulating or handling of the valve. The inner end 19 of the bushing is preferably stepped and tapered, as best seen in Fig. 2, to facilitate its insertion in the valve passage.

If desired, the cylinder wall portions of the bushing may be extremely thin in cross section, since the function of this portion of the gasket is primarily for the retention of the gasket in place whereas the flange portion should have a thickness of gasket proportions, for example about 0.06 inch with the material used herein.

Disposed on the outer end of the bushing and forming a closure for the opening 24, which extends through the bushing and constitutes essentially a part of the discharge passage 18 for the valve, is a substantially cup-shaped cap 26, the inturned rim 28 of which is arranged to snap over the edge of the bushing flange 22 to secure the cap in place. A tab 30 forming a part of the cap facilitates the placement of the cap over the end of the bushing, and also assists in its removal when it is desired to place the cylinder in use.

An enlarged view of the self-retaining gasket and protective cap assembly is shown in Fig. 2. As seen therein, the rim 22 of the gasket is preferably tapered inwardly to a slight degree and the flange 28 of the cap member correspondingly inclined so as to converge slightly. By this construction, a most satisfactory gripping engagement of the cap on the rim of the flanged bushing is achieved for retention of the cap thereon. It will be understood that the substantially flat central portion of the cap 26 is relatively thin and intentionally flexible, so that it is possible to bend and thus snap the cap over the bushing. The cap may be made of the same material as the gasket bushing, or it may be made of a softer or more flexible material which facilitates its application to or removal from the end of the gasket bushing. It is preferably also of molded construction.

Illustrated in Fig. 3 is a connector yoke 36 of the type with which the cylinder valve 12 conventionally is used. The construction of such cylinder connectors is well known to those skilled in the art and is shown and described in substantial detail in the U.S. Patent No. 2,169,082. Without needlessly describing the connector 36, in detail, it will be seen that it includes an encircling yoke portion 38 which carries a handle 40 having a threaded stem 42, the inner end of which is adapted to engage the longitudinal portion 14 of the cylinder valve. By insertion of the cylinder valve in the yoke and tightening the hand wheel, the seating face 16 of the cylinder valve is brought forcefully into engagement with the corresponding seating face 16' of the connector yoke in which is formed a passage, not shown, for receiving the cylinder contents discharged through the valve discharge passage 18. A nipple 44 in which the connector passage is formed provides a means for insuring registry with the valve discharge port; the nipple being adapted to be inserted into the valve passage when the cylinder valve is in proper alignment. It will be seen that the rim portion 22 of the gasket sealing bushing is compressed between the seating face 16 and 16' of the valve connection thus affording a gas-tight seal surrounding the terminal end of the valve discharge passage. In the particular construction herein illustrated having means such as the nipple 44 for orienting the valve discharge opening in the connector yoke, the opening 24 of the bushing is made of sufficient diameter to accept the nipple. In the apparatus already widely used commercially for anesthetic machines and the like, this is easily accomplished, inasmuch as there is a sufficient difference between the diameter of the nipple and the valve discharge passages to allow for the thickness of the bushing 20. In other instances, it may be necessary or desirable to adjust these dimensions, so that the valve equipped with the improved gasket means of the present invention may be accommodated.

The cylinder valve 12 is provided with the conventional control means such, for example, as a passage 46 which receives high pressure fluid from the cylinder and a threaded valve stem 48 having an outer tool receiving end 50 which is adapted by rotational adjustment to close off the high pressure passage 46 or permit the discharge of fluid therefrom to the discharge passage 16. A conventional cylinder packing means 52 is provided to prevent the leakage of high pressure fluid around the valve stem. The apparatus shown also is provided with a stabilizer of the type frequently employed in such valves to resist the torsional effects exerted on the valve connection. This construction includes a pair of extendable plates 31, only one of which is shown, which are expanded by the threaded stem 42 against the side portions of the yoke extension 38. The operation of the stabilizer and the construction thereof are described in the above-mentioned U.S. Patent No. 2,169,082 and are well known to those skilled in the art.

It will be seen that the improved gasket and protective means of the present invention are not of permanent installation. Thus, when a depleted cylinder is received at a plant for refilling the bushing may be extracted to facilitate the cleaning and/or necessary servicing of the valve and cylinder. When the cylinder has been refilled, a new self-retaining gasket device is then readily inserted together with a protective cap. These members in combination then serve as a protection for the valve seating surface and as a means for preventing the entrance of dust or other foreign material into the valve discharge passage. When it is desired to place the cylinder in service the cap is snapped off the rim 22 of the self-retaining bushing exposing the valve discharge passage so that the valve is ready for use. In the construction of the self-retaining gasket and protective cap of this invention, the bushing 20 is proportioned so that the frictional force produced by its insertion in the valve discharge passage exceeds the force with which the removable cap 26 is retained on the outer flange 22. This is accomplished by a suitable proportioning of the cap flange 28 and the degree of taper provided between the engaging surfaces of the cap and the outer rim of the bushing. In the device shown an inward taper around the edge of the flange rim of five degrees and a corresponding inclination of the cap rim of slightly greater than five degrees have been found to be suitable. In this manner the cap may be removed without extracting or displacing the gasket bushing.

From the foregoing description, it will be apparent that the invention provides a combined gasket sealing and protective device of particular advantage in connection with yoke-type cylinder valves which is extremely simple and compact in construction and which considerably reduces the disadvantages that heretofore have been experienced in the filling, reconditioning, and handling of such gas cylinders and gas cylinder valves. It will be understood that the invention is not limited to the specific preferred embodiment herein shown and described but may be used in other ways without departing from its spirit as defined by the following claims.

I claim:

1. A yoke-type cylinder valve assembly comprising a valve body having a flat discharge face, a passage terminating in a discharge opening in said valve face, a cylindrical removable bushing frictionally received in said passage having an annular flange at its outer end extending radially outwardly covering an annular portion of said valve face surrounding said discharge opening and providing a valve gasket for said discharge opening, said flange lying substantially flush against said valve face and adapted to be compressed between said valve face and an engaging surface to form a gas-tight seal around said discharge opening and a flexible cap removably seated on the outer end of said bushing, said cap being substantially cup-shaped, and having a substantially flat, circular bottom portion and an inturned cup-forming annular rim, said rim being expandable to permit the open side of said cap to be pressed over and grip said annular flange whereby said cap is frictionally retained on said bushing and such that said bottom portion of said cap lies over the exposed surface of said annular flange to provide a dust-tight protective cover therefor.

2. A yoke-type cylinder valve assembly comprising a valve body having a flat discharge face adapted to be received in a yoke-holder in which said valve discharge face is arranged to abut against a corersponding face of said holder, a passage terminating in a discharge opening in said valve discharge face through which the cylinder contents are adapted to be delivered to a communicating passage in said yoke-holder, a cylindrical, removable bushing made of a compressible, relatively non-ignitible, moldable gasket material, frictionally received in said passage having an annular flange at its outer end extending radially outwardly covering an annular portion of said valve face surrounding said discharge opening and lying substantially flush against said valve face to provide a valve gasket for said valve discharge opening which is adapted to be compressed between the abutting faces of said valve body and said yoke-holder, said flange having a raised portion forming an annular bead on one side thereof effective upon compression of said gasket flange between said discharge face and said yoke-holder to facilitate the formation of a gas-tight seal between said members, and a flexible cap removably seated on the outer end of said bushing, said cap being substantially cup-shaped, and having an inturned cup-forming annular rim, said rim having a slightly converging tape along the inner face thereof and the outer circumferential edge of said annular flange having a co-operating inward taper whereby said flange taper affords a gripping edge for the reception of said rim and said rim being expandable to permit the open side of said cap to be pressed over and grip said annular flange whereby said cap is frictionally and positively retained on said bushing.

References Cited in the file of this patent

UNITED STATES PATENTS

| | | |
|---|---|---|
| 2,169,082 | Stevens et al. | Aug. 8, 1939 |
| 2,632,478 | Ronfeldt | March 24, 1953 |
| 2,669,369 | Towns | Feb. 16, 1954 |
| 2,772,802 | Woydatt et al. | Dec. 4, 1956 |

FOREIGN PATENTS

| | | |
|---|---|---|
| 496,407 | Canada | Sept. 29, 1953 |